United States Patent [19]

Oh

[11] Patent Number: 5,408,449
[45] Date of Patent: Apr. 18, 1995

[54] DIGITAL AUDIO PLAYER WITH MUSIC MEMORY FUNCTION FOR AN INTRO-PLAY OPERATION

[75] Inventor: Jin-keun Oh, Seoul, Rep. of Korea

[73] Assignee: Samsung Electronics Co., Ltd., Kyungki-do, Rep. of Korea

[21] Appl. No.: 159,251

[22] Filed: Nov. 30, 1993

[30] Foreign Application Priority Data

Nov. 30, 1992 [KR] Rep. of Korea .................. 92-22932

[51] Int. Cl.$^6$ ................................................ G11B 7/00
[52] U.S. Cl. ........................................ 369/32; 369/33
[58] Field of Search ................ 369/32, 33, 47, 48, 369/30

[56] References Cited

U.S. PATENT DOCUMENTS

| Re. 34,475 | 12/1993 | Custers et al. | 369/32 |
|---|---|---|---|
| 4,779,252 | 10/1988 | Custers et al. | 369/32 |
| 4,817,075 | 3/1989 | Kikuchi et al. | 369/33 |
| 4,872,151 | 10/1989 | Smith | 369/33 |
| 5,063,547 | 11/1991 | Custers et al. | 369/32 |
| 5,173,888 | 12/1992 | An | 369/33 |
| 5,228,014 | 7/1993 | D'Alayer de Costemore | 369/32 |
| 5,285,437 | 2/1994 | Yokota et al. | 369/64 |

*Primary Examiner*—Georgia Y. Epps
*Assistant Examiner*—Tan Dinh
*Attorney, Agent, or Firm*—Sughrue, Mion, Zinn, Macpeak & Seas

[57] ABSTRACT

A digital audio disc player, having a music memory function which is operative during an intro-play mode of operation, includes a memory for storing at least one of a plurality of music item numbers and an operating sequence for reproduction, an input device for generating an intro key signal initiating a intro-play function, a play key signal causing reproduction of music, and a memory key signal directing storage of a respective music item number during the intro-play operation, a microprocessor performing the intro-play function in response to the intro key signal according to the operating sequence, stores the respective music item number of the currently reproduced music in the memory when the memory key signal key is input during the intro-play operation, and controls reproduction of the music corresponding to the respective music item numbers stored in the memory when the play key signal is input, and a disc reproduction device which demodulates and reproduces a signal recorded on a digital audio disc according to the control of the microprocessor. Thus, storage of desired music item number is simplified by enabling music item number storage during the course of the intro-play operation, thereby enhancing user convenience when operating the digital audio disc player in the intro-play mode of operation.

5 Claims, 5 Drawing Sheets

DIGITAL AUDIO PLAYER WITH MUSIC MEMORY FUNCTION FOR AN INTRO-PLAY OPERATION

FIELD OF THE INVENTION

The present invention relates to a disc reproduction device which reproduces music from a digital audio disc (hereinafter called a "disc"). More particularly, the present invention is related to a device for storing a music item number in a memory during an intro-play operation. The stored number is useful for selecting a desired music item from the disc. A method for storing the music item number during an intro-play mode of operation is also disclosed.

Korean Patent Application No. 92-22932 filed Nov. 30, 1992, is incorporated herein by reference.

BACKGROUND OF THE INVENTION

Generally, the intro-play operation of a digital audio disc player refers to a function that sequentially reproduces the forepart of a music item recorded on a disc for a certain period of time, for example, ten seconds. This period allows the listener to recall the contents of the entire music item. In the conventional method, the intro-play function enables the selection of the music item after listening to a portion thereof. Here, the function of selecting the desired music item and the function of storing the selected music item numbers are separate from each other.

FIG. 1 is a block diagram showing the structure of a conventional digital audio disk player. Referring to FIG. 1, a disc player consists of an input device 10, a microprocessor 20, a memory 30, a display 40 and a disc reproduction device 50. Input device 10 comprises a number of keys producing respective signals for selection of various functions to be executed by the disc player. For example, an intro-key K1 provides an intro-key signal for initiating an intro-play function, a play key K2 provides a play key signal for starting full reproduction, and a keypad K3 produces numerical signals corresponding to music item numbers for selecting music items are included in input device 10.

Microprocessor 20 controls a memory 30, a display 40, and a disc reproduction device 50 in order to perform the functions requested by a user according to the respective key-input signal provided by input device 10. That is, microprocessor 20 stores the desired music item number in memory 30, controls the reproduction sequence according to the music item number stored in memory 30, and then manipulates the information to be displayed on display 40. Disc reproduction device 50 extracts (via an optical pickup) and demodulates the table of contents (TOC) information recorded on the lead-in region of the disc (for example, a compact disc), audio data recorded in the music region, and data in the lead-out region. Then, the demodulated audio signal is converted into an analog signal to be processed through audio circuitry (i.e., equalizers, amplifiers, speakers etc.), while the sub-code data is stored in memory 30.

Microprocessor 20 carries out its various functions by referring to the sub-code data. Thus, the conventional disc player is unable to store the music item number during an intro-play operation since the intro-play and storing operations are separate from each other. Accordingly, the user must remember the desired music item numbers identified during intro-play and, when the intro-play operation is completed, the relevant music item numbers are successively stored in memory 30 by means of keypad K3 of input device 10. Only then can the stored music item numbers permit reproduction of the corresponding music items.

FIG. 2 is a flowchart showing steps for carrying out an intro-play function using the device of FIG. 1. Referring to FIG. 2, in step S1, while listening to a prerecorded disc, the user pushes intro-key K1 of input device 10 in order to select, for example, a music item. The disc player starts the intro-play function in step S2 according to the intro-key signal of input device 10. In step S3, microprocessor 20 indicates an intro-play function on display 40 and reads the TOC information recorded on the disc by controlling disc reproduction device 50. This TOC information is then stored in memory 30. A pointer for a recorded music item, the music item's starting time (hour, minutes & seconds), and an index are recorded in the TOC. In addition to this, microprocessor 20 initializes the music item number (i) to "01" in order to sequentially reproduce the music items starting from the first one. Therefore, the intro-play operation starts from music item number 01. In general, the music item number (i) is available from 01 to 99. Here, however, since the number of music items recorded on a given disc varies from disc to disc, the last music item number ($i_{LAST}$) can be sought by referring to the TOC.

In step S4, disc reproduction device 50 starts reproduction of the music item selected according to the music item number (i), under control of microprocessor 20, and counts the reproduction time (t). In step S5, the reproduction time (t) is continually compared with a predetermined reference time, so that each music item can be reproduced for a specific duration in step S4. That is, the intro-play operation does not reproduce the entire music item but reproduces only the forepart of the music item corresponding to the predetermined reference time, in order to quickly reveal the contents of a recorded music item and thereby enable the user to make a music item selection. For example, if the reference time is fixed as ten seconds, the reproduction time after the start time of step S4 is examined. When ten seconds have elapsed in step S5, the program advances to step S6, wherein the next music item can be reproduced by incrementing the music item number (i) by 1. In step S7, it is determined whether an intro-play operation of the final recorded music item has been completed, by comparing the music item number (i) with the last music item number ($i_{LAST}$). That is, if (i) is less than ($i_{LAST}$), then the next music item is reproduced in step S4.

FIG. 3 is a flowchart showing steps for carrying out a music memory function using the device of FIG. 1. Referring to FIG. 3, it is important to note that the user must remember the desired music item number during the intro-play operation. When the intro-play operation is finished, the user inputs the appropriate music item number or numbers. That is, during step S8, the user inputs the desired music item numbers to microprocessor 20 by pushing (entering) the proper keys of keypad K3 of input device 10. In step S9, microprocessor 20 then stores the input music item numbers in a specific region of memory 30, in input order.

FIG. 4 is a flowchart showing steps for carrying out the play function using the device of FIG. 1. Referring to FIG. 4, in step S10, play key K2 of input device 10 is pushed and the play key signal is input to microprocessor 20 so as to play the music items corresponding to the stored music item numbers stored in memory 30. Then, in step S11, reproduction starts in accordance with the input of the play key signal. During step S12, microprocessor 20 sequentially reproduces the music items corresponding to the music item numbers stored in memory 30, by controlling disc reproduction device 50 to thereby enable listening.

As described above, conventional disc player operation includes steps for intro-playing the music item, storing the desired music item number, and reproducing the selected music item. Accordingly, the user is inconvenienced by the need to remember the desired music item numbers during the intro-play operation. This problem is exacerbated when many potential music items exist.

SUMMARY OF THE INVENTION

Accordingly, it is an object of the present invention to provide a digital audio disc player provided with a music memory function which can simply store desired music item numbers during the course of an intro-play operation.

It is another object of the present invention to provide a music item number storing method for an digital audio disc player, which is operable during intro-play.

To accomplish the above object, there is provided a digital audio disc player with a music memory function for an intro-play operation, comprising:

a memory for storing a plurality of music item numbers and sequence information;

input means for generating an intro key signal to operate the intro-play function, a play key signal to reproduce entire music items, and a memory key signal to store a respective one of the music item numbers during intro-play operation;

a microprocessor which starts the intro-play function according to the provided sequence when the intro key signal is input, which stores into memory one of the music item numbers corresponding to the currently reproduced music item when the memory key signal is input during the intro-play operation, and which outputs a control signal so as to successively reproduce respective music items corresponding to the music item numbers stored in the memory when the play key signal is input; and a disc reproduction device which demodulates and reproduces a signal recorded on a digital audio disc under control of the microprocessor.

To accomplish the other object of the present invention, there is provided a method for storing a music item number during an intro-play operation of a digital audio disc player having an input device with an intro key, a play key and a memory key, a microprocessor, a memory, and a disc reproduction device, the method comprising the steps of:

generating an intro key signal;

reading the table of contents information from a digital audio disc when the intro key signal is input and initializing a music item number;

reproducing a respective music item corresponding to the music item number using the disc reproduction device and counting respective reproduction time;

determining whether a memory key signal is input during the music reproducing step;

storing into the memory the music item number corresponding to the music item currently being reproduced, when the memory key signal is input;

determining whether the reproduction time exceeds a predetermined reference time;

incrementing the music item number when the reproduction time surpasses the predetermined reference time;

comparing the incremented music item number with a recorded music item number corresponding to a total number of previously recorded music items on the digital audio disc; and sequentially reproducing the desired music items in accordance with all of the music item numbers stored in the memory, when the play key signal is received.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Preferred embodiments of the present invention will be described below in more detail with reference to the attached drawings.

Figure 1:
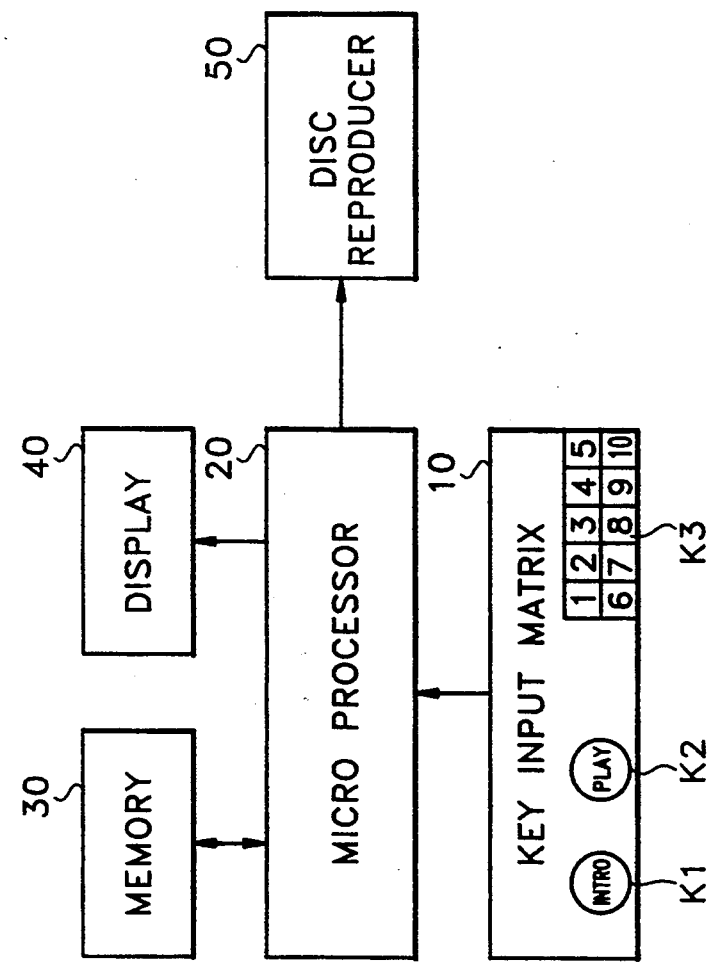
FIG. 1 is a block diagram showing the schematic structure of the conventional digital audio disc player.
Figure 2:
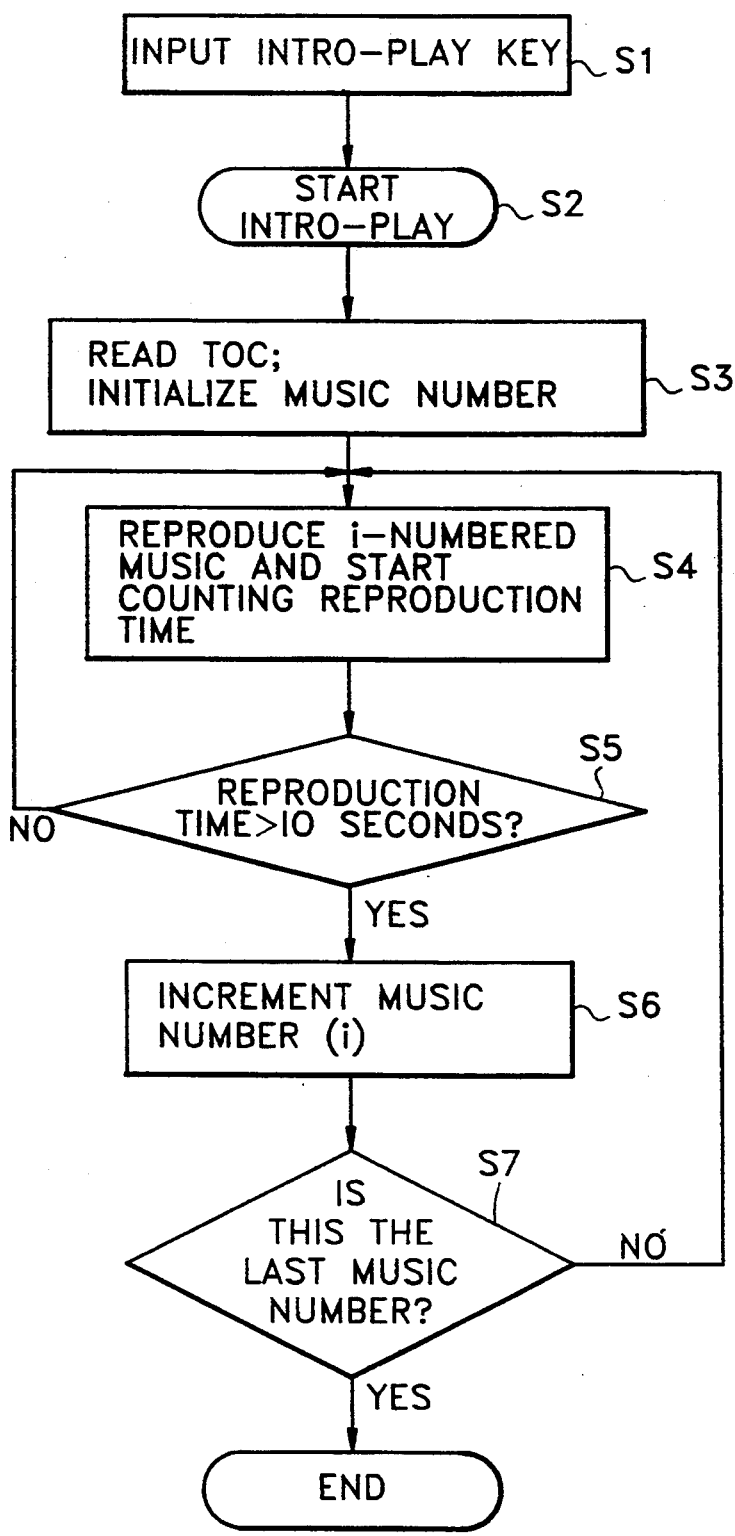
FIG. 2 is a flowchart showing steps for carrying out an intro-play function using the device of FIG. 1.
Figure 3:
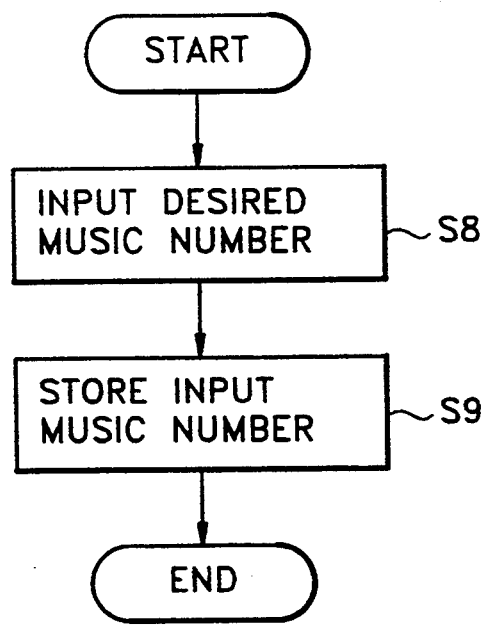
FIG. 3 is a flowchart showing steps for carrying out a music memory function using the device of FIG. 1.
Figure 4:
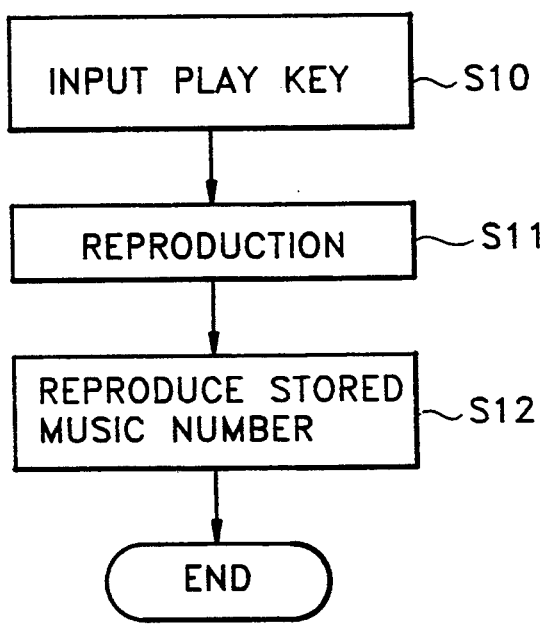
FIG. 4 is a flowchart showing steps for carrying out a play function using the device of FIG. 1.
Figure 5:
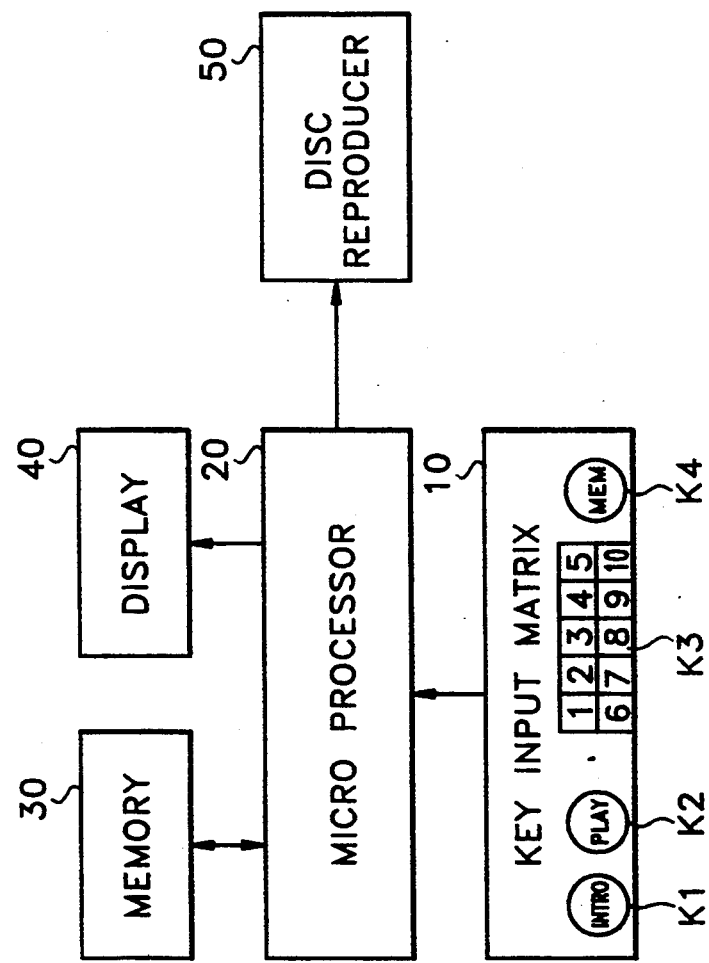
FIG. 5 is a block diagram showing the schematic structure of a digital audio disc player having a music memory function operable during intro-play according to the present invention.

FIG. 5 is a block diagram showing the schematic structure of the present invention, i.e., a digital audio disc player wherein the music memory function is operable during an intro-play operation. Referring to FIG. 5, a disc player comprises an input device 10, a microprocessor 20, a memory 30, a display device 40 and a disc reproduction device 50. Input device 10 includes various keys permitting selection of music item numbers and other disc player function, such as an intro key K1, play key K2, keypad K3 and memory key K4. Here, intro key K1 generates an intro key signal for initiating intro-play function, play key K2 generates a play key signal permitting reproduction of the music items recorded on a disc according to the control of microprocessor 20, keypad K3 generates keypad signals permitting input of the music item numbers, and memory key K4 generates a memory key signal which instructs microprocessor 20 to store the desired music item number reproduced during intro-play. Specifically, memory key K4 is advantageously provided for integrating the intro-play and music memory storage functions. Since the music item number of the currently reproduced music item is saved in memory 30 automatically when memory key K4 is pushed during the intro-play operation, the selection of desired music items is advantageously simplified.

According to the various key-input signals provided by input device 10, microprocessor 20 controls memory 30, display device 40 and disc reproduction device 50 in order to perform the desired functions. That is, microprocessor 20 stores the desired music item number in memory 30, controls sequential reproduction according to the stored music item numbers in the memory 30, and designate the information to be displayed on display device 40. Specifically, microprocessor 20 starts the intro-play function in accordance with a predetermined sequence when intro key signal is input, stores the music item number for reproduction in memory 30 when memory key signal is input in the course of performing the intro-play function, and controls disc reproduction device 50 so as to sequentially reproduce the music items corresponding to the music item numbers stored in the memory 30 when the play key signal is input. Disc reproduction device 50 extracts the TOC information recorded on the disc's lead-in region, the audio data recorded on the music region, and the sub-code data from the lead-out region, and then demodulates this information and data. The demodulated audio signal is converted into analog form and processed in audio circuitry, while the sub-code data is stored in memory 30. Microprocessor 20 preferably performs various functions while referring to the sub-code data.

Figure 6:
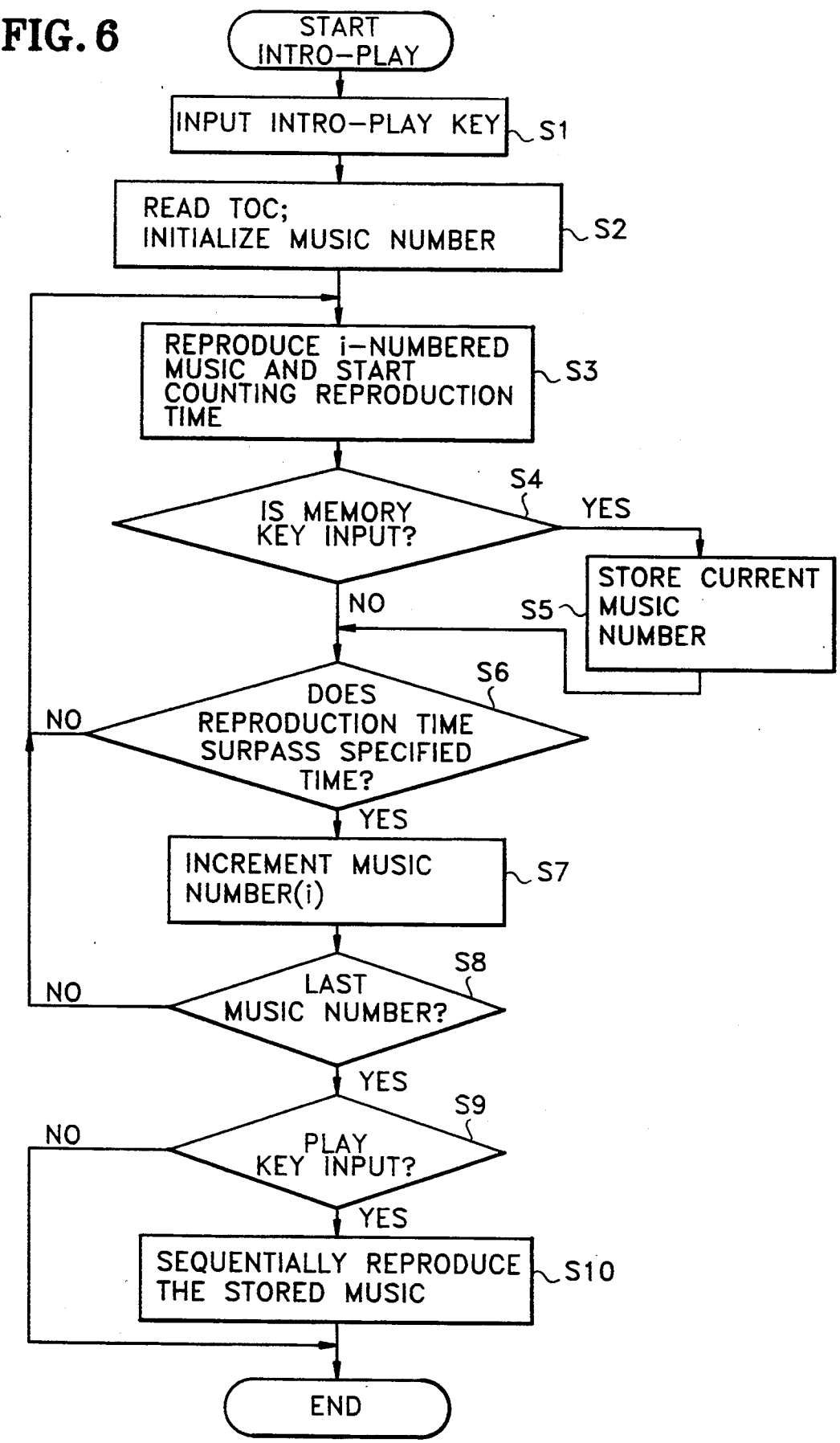
FIG. 6 is a flowchart showing steps for carrying out a music memory function using the device of FIG. 5 during an intro-play and subsequent play operations.

FIG. 6 is a flowchart showing steps for carrying out a music item number memory function during the intro-play operation using the device of FIG. 5. Referring to FIG. 6, in step S1, during disc player operation, the user initiates the intro-play function in response to the intro-key signal from intro key K1 of input device 10 so as to select music items according to the intro-play operation. When the intro-play operation starts, the disc's TOC information is read and a first music item number (i) is initialized in step S2. That is, in step S2, microprocessor 20 indicates the operation according to an intro-play mode of operation on display device 40, controls disc reproduction device 50 in order to read the TOC information recorded on the disc, and then stores the read TOC information in memory 30.

The TOC data is recorded together with a pointer to a recorded music item, its starting time, absolute time and an index. Microprocessor 20 initializes the music number (i) to "01" so as to sequentially reproduce music items starting from the first music item. Generally, music item numbers (i) ranging from 01 to 99 are available. However, since the number of music items recorded on a specific disc differs from that of other discs, the last music item number ($i_{LAST}$) can be determined by referring to the TOC.

In step S3, disc reproduction device 50 reproduces the music item selected according to the music item number (i) under the control of microprocessor 20, and starts to count the reproduction time (t). Meanwhile, as the user listens to the music item wherein the intro-play operation is being is performed according to step S3, he/she pushes memory key K4 of input device 10 if the present music item is a desired music item. Accordingly, step S4 determines whether memory key signal is input and, if so, the music item number (i) of the currently reproduced music item is sequentially stored in a specific region of memory 30, during step S5. Then, in step S6, the reproduction time (t) is continually compared with a predetermined reference time, so that the music item reproduced in step S3 is reproduced for a time equal to that of the predetermined reference time. That is, the intro-play operation does not reproduce the entire music item but reproduces only the forepart thereof, in order to quickly reveal the contents of recorded music items and thereby enable the user to make a music item selection. For example, if the reference time is fixed as ten seconds, the reproduction time is repeatedly checked from initiation of reproduction during step S3. When ten seconds have elapsed, the program advances to step S7, wherein the next music item can be reproduced by incrementing the music item number (i) by 1 if the reference time (ten seconds) has elapsed in step S6. In step S8, the music item number (i) is compared with the last music item number ($i_{LAST}$) so as to determine whether the intro-play operation of the last music item recorded on the disc has been completed. That is, if (i) is less than ($i_{LAST}$), the next music item is reproduced by looping back to step S3. Step S9 checks to see whether the play key signal is input, and if so, the program advances to step S10, but if it is not, the procedure ends. In step S10, the music items corresponding to respective music item numbers stored in memory 30 are reproduced in recorded order during the play operation, thus enabling listening.

As described above, the present invention may be used in the field of compact disc players and laser disc players, to simplify storage of music item numbers during intro-play and then to reproduce the desired music items according to key operations to thereby improve user convenience.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A digital audio disc player with a music memory function operative during operation according to an intro-play function, comprising:
   a memory for storing a music item number and an operating sequence;
   input means for generating a plurality of signals including an intro key signal for initiating operation of said intro-play function, a play key signal for initiating reproduction of music, and a memory key signal for directing storage of said music item number during said intro-play function;
   a microprocessor for starting said intro-play function according to said operating sequence when said intro key signal is received, for storing into said memory said music item number of the currently reproduced music item when said memory key signal is input during operation according to said intro-play function, and for generating a control signal so as to reproduce music corresponding to said music item number stored in said memory when said play key signal is received; and
   a disc reproduction device which demodulates and reproduces a signal corresponding to said music item recorded on a digital audio disc according to control of said microprocessor.

2. A method for storing a music item number during an intro-play mode of operation of a digital audio disc player including an input device having an intro key, a play key, a memory key for generating respective intro key, play key, and memory key signals, a microprocessor receiving the intro key, the play key, and the memory key signals, a memory, and a disc reproduction device, said method comprising the steps of:

(a) reading table of contents information from a digital audio disc storing recorded music and disposed in said disc reproduction device and initializing a music item number in response to said intro key signal;

(b) performing an intro-play function by repeatedly performing substeps of:

(i) reproducing a music item corresponding to said music item number using said disc reproduction device and counting a reproduction time;

(ii) determining whether said reproduction time surpasses a predetermined reference time;

(iii) incrementing said music item number by 1 when said reproduction time surpasses said predetermined reference time to thereby produce an incremented music item number;

(iv) completing said intro play function when said incremented music item number is equal to a last music item number of the previously recorded music on said digital audio disc;

(c) storing into said memory said music item number corresponding to the music currently being reproduced, when said memory key signal is input during said step (b); and (d) reproducing said music item in accordance with said music item number stored in said memory, during said step (c) when said play key signal is input.

3. A method for reproducing at least one music item recorded on a recording medium comprising the steps of:

(a) performing an intro-play operation in which a portion of at least one recorded music item is reproduced;

(b) inputting a memory key signal during said intro-play operation;

(c) storing information designating that music item being reproduced during the intro-play operation as a designated music item; and (d) reproducing said designated music item in accordance with the stored information.

4. The method defined in claim 3, wherein said storing step (c) includes storing a music item number corresponding to a respective one of a plurality of music items recorded on the recording medium.

5. The method defined in claim 3, wherein step (a) comprises the step of comparing a reproduction time of said at least one music item partially reproduced during said intro-play operation with a predetermined time.

* * * * *